United States Patent
Sawada et al.

(10) Patent No.: US 11,390,139 B2
(45) Date of Patent: Jul. 19, 2022

(54) VEHICLE AIR CONDITIONING DEVICE

(71) Applicant: Toyota Jidosha Kabushiki Kaisha, Toyota (JP)

(72) Inventors: Naoki Sawada, Okazaki (JP); Hideyuki Sakurai, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 295 days.

(21) Appl. No.: 16/697,841

(22) Filed: Nov. 27, 2019

(65) Prior Publication Data

US 2020/0171911 A1 Jun. 4, 2020

(30) Foreign Application Priority Data

Dec. 3, 2018 (JP) .............................. JP2018-226523

(51) Int. Cl.
*B60H 1/00* (2006.01)
*B60H 1/24* (2006.01)

(52) U.S. Cl.
CPC ....... *B60H 1/0055* (2013.01); *B60H 1/00028* (2013.01); *B60H 1/00428* (2013.01); *B60H 1/00564* (2013.01); *B60H 1/242* (2013.01); *B60H 1/243* (2013.01); *B60H 2001/002* (2013.01); *B60H 2001/00192* (2013.01); *B60H 2001/00214* (2013.01)

(58) Field of Classification Search
CPC .............. B60H 1/0055; B60H 1/00028; B60H 1/00428; B60H 1/00564; B60H 1/242; B60H 1/243; B60H 1/00857; B60H 1/00871; B60H 1/3421; B60H 1/26; B60H 1/3414; B60H 2001/00192; B60H 2001/002; B60H 2001/00214; B60H 2001/3471
See application file for complete search history.

(56) References Cited

U.S. PATENT DOCUMENTS

| | | | | |
|---|---|---|---|---|
| 4,173,174 A | * | 11/1979 | Vinko | B60H 1/247 454/124 |
| 4,709,957 A | * | 12/1987 | Ohya | B60J 1/10 49/374 |
| 4,783,115 A | * | 11/1988 | Galubensky | B60H 1/00507 277/608 |

(Continued)

FOREIGN PATENT DOCUMENTS

| | | | | |
|---|---|---|---|---|
| DE | 3246579 A1 | * | 6/1984 | ............. B60K 37/04 |
| JP | 2005-035491 A | | 2/2005 | |

(Continued)

*Primary Examiner* — Emmanuel E Duke

(74) *Attorney, Agent, or Firm* — Dinsmore & Shohl LLP

(57) ABSTRACT

A vehicle air conditioning device comprises an instrument panel, a door that includes an overlapping portion where part of the door overlaps with the instrument panel in a closed state of the door, and a door blower outlet that opens toward a vehicle cabin interior, a first opening that is open toward the door, a second opening that is open toward the instrument panel, an air conditioning unit body, a first duct that that has a length direction end portion connected to the first opening, a second duct that has a length direction end portion connected to the door blower outlet, and a fin member respectively provided at the first opening and the second opening.

9 Claims, 8 Drawing Sheets

(56) References Cited

U.S. PATENT DOCUMENTS

| | | | | |
|---|---|---|---|---|
| 6,254,175 | B1* | 7/2001 | Kim | B60H 1/3421 296/146.7 |
| 8,025,559 | B2* | 9/2011 | Schweitzer | B60H 1/00564 454/69 |
| 2008/0293348 | A1* | 11/2008 | Schweitzer | B60H 1/00564 454/69 |
| 2016/0288609 | A1* | 10/2016 | Yamaoka | B60H 1/00678 |

FOREIGN PATENT DOCUMENTS

| | | |
|---|---|---|
| JP | 2005-280531 A | 10/2005 |
| JP | 2014-141131 A | 8/2014 |

* cited by examiner

VEHICLE AIR CONDITIONING DEVICE

CROSS-REFERENCE TO RELATED APPLICATION

This application is based on and claims priority under 35 USC 119 from Japanese Patent Application No. 2018-226523 filed on Dec. 3, 2018, the disclosure of which is incorporated by reference herein.

BACKGROUND

Technical Field

The present disclosure relates to a vehicle air conditioning device.

Related Art

For example, Japanese Patent Application Laid-Open (JP-A) No. 2005-35491 discloses a vehicle air conditioning device. In this vehicle air conditioning device, a duct is provided at guide air flowing from an air conditioning unit provided inside an instrument panel to a blower outlet provided in a door trim. This enables moving air from the air conditioner to be delivered to a closer position to an occupant.

However, in the vehicle air conditioning device disclosed in JP-A No. 2005-35491, openings are provided between the instrument panel and a door. In a closed state of the door, the openings are superimposed on each other to configure part of the duct. Accordingly, when the door is opened, the openings can be seen by an occupant as they enter or exit, and internal parts can be seen through the openings, which is detrimental to external styling. The vehicle air conditioning device disclosed in JP-A No. 2005-35491 therefore leaves room for improvement regarding this point.

SUMMARY

The present disclosure provides a vehicle air conditioning device capable of improving external styling when a door is open.

A vehicle air conditioning device according to a first aspect includes an instrument panel that is provided at a front side of a vehicle cabin, a door that is provided at a vehicle width direction outer side of the instrument panel so as to be capable of opening and closing, and that includes an overlapping portion where part of the door overlaps with the instrument panel in a closed state of the door, and a door blower outlet that opens toward a vehicle cabin interior, a first opening that is provided at the instrument panel at a location corresponding to the overlapping portion of the door and that is open toward the door, a second opening that is provided at the overlapping portion of the door at a location corresponding to the first opening and that is open toward the instrument panel, an air conditioning unit body that is provided inside the instrument panel and that supplies air through a blower outlet, a first duct that is formed in a tube shape, that has one length direction end portion connected to the blower outlet, and that has another length direction end portion connected to the first opening, a second duct that is formed in a tube shape, that has one length direction end portion connected to the second opening, and that has another length direction end portion connected to the door blower outlet, and a fin member respectively provided at the first opening and the second opening to place the first opening and the second opening in a closed state when the door is open, and to place the first opening and the second opening in an open state when the door is closed.

In the first aspect, the door that is capable of opening and closing is provided at the vehicle width direction outer side of the instrument panel provided at a front second of the vehicle cabin. The door includes the overlapping portion where part of the door overlaps with the instrument panel in the closed state of the door, and the door blower outlet that is open toward the vehicle cabin interior. The first opening is provided at the instrument panel at the location corresponding to the overlapping portion. The second opening is formed to the overlapping portion of the door at the location corresponding to the first opening. The air conditioning unit body that supplies air through the blower outlet is provided inside the instrument panel. The one length direction end portion of the tube shaped first duct is connected to the blower outlet of the air conditioning unit body, and the other length direction end portion of the first duct is connected to the first opening described above. Namely, moving air supplied from the air conditioning unit body travels through the first duct to the first opening. The one length direction end portion of the second duct, which is tube shaped similarly to the first duct, is connected to the second opening described above, and the other length direction end portion of the second duct is connected to the door blower outlet. Namely, when the first opening and the second opening are at positions overlapping with each other in the closed state of the door, moving air supplied from the air conditioning unit body travels through the first opening and the second opening to the door blower outlet.

The fin member is respectively provided at the first opening and the second opening. When the door is open, the fin member places the first opening or the second opening in the closed state. Internal parts are thus less likely to be seen through the opening by an occupant when the door is in an open state. When door is closed, the fin member places the first opening or the second opening in the open state, such that the flow of moving air from the first duct to the second duct is not obstructed.

Note that the "closed state" not only refers to a state in which the first opening or the second opening is completely closed, but also includes states in which the first opening or the second opening is closed by the fin member to a degree where the inside of the first opening or the second opening is not likely to be visible.

A vehicle air conditioning device according to a second aspect is the first aspect, wherein the fin member is axially supported by a fin shaft with an axial direction running along a width direction of the first opening or the second opening. The fin member is inclined toward a vehicle vertical direction around the fin shaft by a link mechanism when the door is open so as to place the first opening or the second opening in the closed state. The fin member is swung around the fin shaft by the link mechanism when the door is closed so as to lie substantially horizontal and place the first opening or the second opening in the open state.

In the second aspect, the fin member is axially supported by the fin shaft with its axial direction running along the width direction of the first opening or the second opening, and the fin member is inclined toward the vehicle vertical direction around the fin shaft by the link mechanism when the door is open so as to place the first opening or the second opening in the closed state. The fin member is swung around the fin shaft by the link mechanism when the door is closed so as to lie substantially horizontal and place the first opening or the second opening in the open state. Namely, the simple configuration employing the link mechanism enables movement of the fin member to be coordinated with opening and closing of the door.

A vehicle air conditioning device according to a third aspect is the second aspect, wherein the link mechanism is connected to a location that is displaced during opening and closing of the door.

In the third aspect, the link mechanism is connected to the location that is displaced during opening and closing of the door, thereby enabling force of the opening or closing door to be utilized to operate the fin member.

A vehicle air conditioning device according to a fourth aspect is the first aspect, wherein a seal member is respectively provided at a peripheral edge of the first opening and a peripheral edge of the second opening.

A vehicle air conditioning device according to a fifth aspect is the second aspect, wherein a seal member is respectively provided at a peripheral edge of the first opening and a peripheral edge of the second opening.

In the fourth aspect and the fifth aspect, the seal member is respectively attached to the peripheral edges of the first opening and the second opening, thereby enabling moving air flowing from the first duct to the second duct to be suppressed from leaking out between the first opening and the second opening when the first opening and the second opening are in an overlapping state.

A vehicle air conditioning device according to a sixth aspect is the fifth aspect, wherein the seal member includes a hollow portion therein, and at least a portion of the link mechanism is accommodated inside the hollow portion.

In the sixth aspect, the seal member includes a hollow portion therein, and at least a portion of the link mechanism is accommodated inside the hollow portion. This enables locations of the link mechanism that are exposed to the exterior to be reduced or eliminated, making the link mechanism less noticeable in an open state of the door.

A vehicle air conditioning device according to a seventh aspect is the fourth aspect, wherein an opening side end portion of the seal member is joined to at least one of the corresponding peripheral edge or a member attached to the peripheral edge.

In the seventh aspect, the opening side end portion of the seal member is joined to at least one of the corresponding peripheral edge or the member attached to the peripheral edge. This enables the deformed seal member to be suppressed from entering the inside of the opening of the first opening or the second opening and obstructing the operation of the fin member when the seal member is squashed.

A vehicle air conditioning device according to an eighth aspect is the second aspect, wherein the fin member is configured by plural fins. The link mechanism includes a coupling rod that is disposed further toward an inside of the first duct or the second duct than the fin shaft, and that axially supports and couples together the plural fins, a door opening-closing coordination rod that extends along the vehicle width direction at a peripheral edge of the first opening or the second opening, and that includes a fin abutting portion configured to abut at least one fin among the plural fins inside of the first duct or the second duct in at least the open state, a first biasing member configured to apply a biasing force to the coupling rod in a direction to transmit the biasing force to the plural fins, and a second biasing member configured to apply a biasing force to the door opening-closing coordination rod in a direction from the inside toward an outside of the first duct or the second duct.

In the eighth aspect, the simple configuration employing the link mechanism enables movement of the fins to be coordinated with opening and closing of the door.

A vehicle air conditioning device according to a ninth aspect is the eighth aspect, further including a frame-shaped frame formed at the peripheral edge of the first opening and the second opening, and inserted into the first opening or the second opening. The door opening-closing coordination rod abuts the frame such that the door opening-closing coordination rod is capable of being slid by the second biasing member.

In the ninth aspect, when the door opening-closing coordination rod moves against the biasing force of the second biasing member, the door opening-closing coordination rod can be suppressed from moving away from the frame.

The vehicle air conditioning device according to the first aspect has an effect of enabling external styling when the door is open to be improved.

The vehicle air conditioning device according to the second aspect has an effect of enabling costs to be suppressed.

The vehicle air conditioning device according to the third aspect has an effect of enabling the fin member to be operated efficiently.

The vehicle air conditioning devices according to the fourth aspect and the fifth aspect have an effect of enabling air to be supplied efficiently.

The vehicle air conditioning device according to the sixth aspect has an effect of enabling external styling when the door is open to be further improved.

The vehicle air conditioning device according to the seventh aspect has an effect of enabling the fin member to be operated more reliably.

The vehicle air conditioning device according to the eighth aspect has an effect of enabling costs to be suppressed.

The vehicle air conditioning device according to the ninth aspect has an effect of enabling the fin member to be operated even more reliably.

BRIEF DESCRIPTION OF THE DRAWINGS

Exemplary embodiments will be described in detail based on the following figures, wherein.

DETAILED DESCRIPTION

Figure 1:
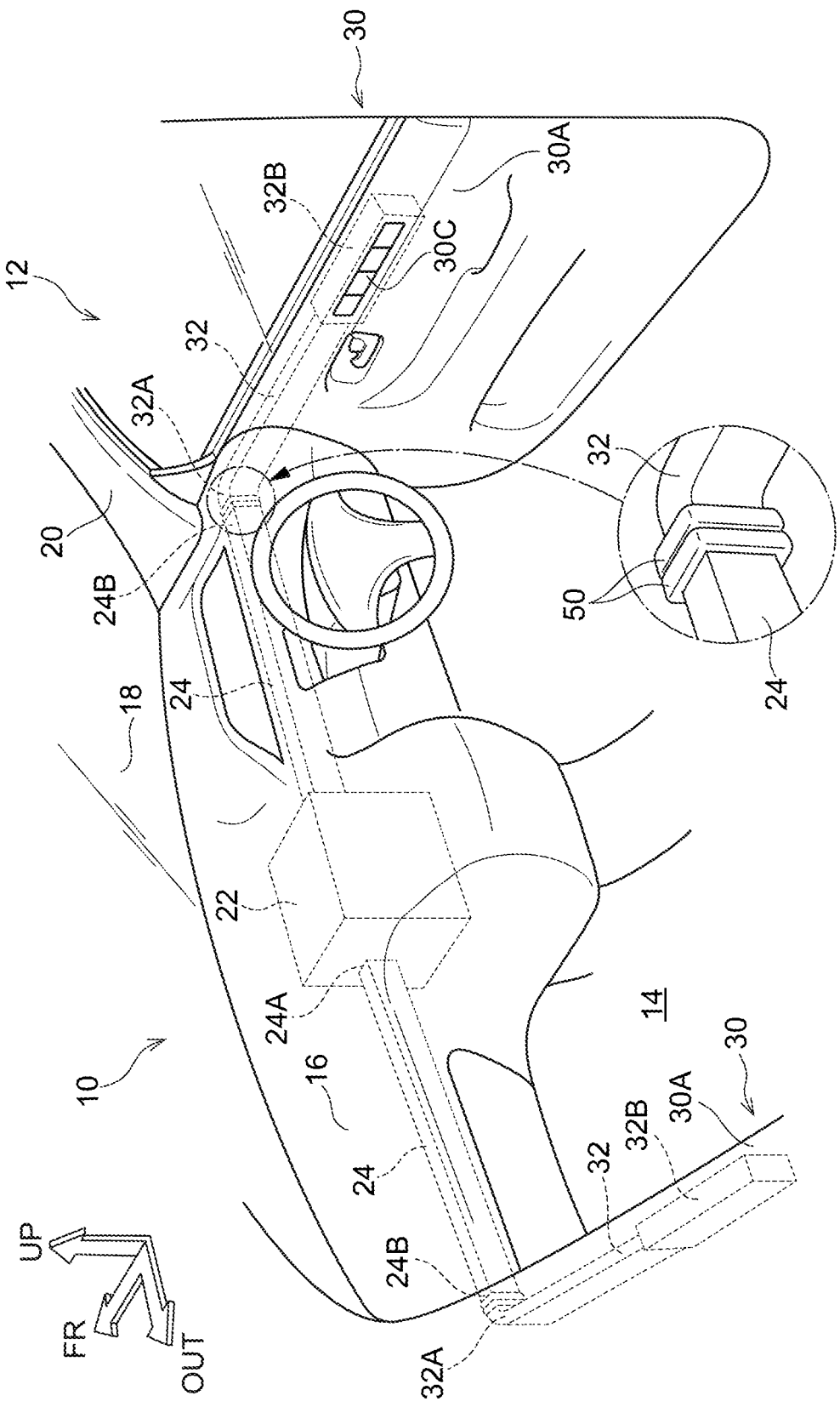
FIG. 1 is a schematic perspective view illustrating a vehicle cabin interior of a vehicle provided with a vehicle air conditioning device according to an exemplary embodiment.

Explanation follows regarding an exemplary embodiment of a vehicle air conditioning device according to the present disclosure, with reference to FIG. 1 to FIG. 8. Note that in the drawings, the arrow FR indicates a vehicle front-rear direction front side, the arrow OUT indicates a vehicle width direction outer side, and the arrow UP indicates a vehicle vertical direction upper side.

Overall Configuration

As illustrated in FIG. 1, a vehicle 12 applied with a vehicle air conditioning device 10 according to the present exemplary embodiment is provided with an instrument panel 16 at the vehicle front side of the interior of a vehicle cabin 14. Specifically, the instrument panel 16 is disposed at an upper portion side on the vehicle rear side of a dash panel (not illustrated in the drawings) that partitions the vehicle cabin 14 from a vehicle front section. A lower end portion of the dash panel is joined to a front end portion of a floor panel, not illustrated in the drawings. The floor panel configures a lower surface of the vehicle cabin 14. An upper end portion of the dash panel is joined to a cowl, not illustrated in the drawings, and the cowl supports a lower end portion of a front glass 18. The front glass 18 configures a front surface of an upper portion side of the vehicle cabin 14, and a lower end portion side of the front glass 18 is disposed at an upper end portion side of the instrument panel 16.

Front seats, not illustrated in the drawings, serving as seats for vehicle occupants, are provided at the vehicle rear side of the instrument panel 16. In the present exemplary embodiment, the front seats are configured by a front passenger seat at a front left side of the vehicle cabin 14, and a driver's seat at a front right side of the vehicle cabin 14.

The instrument panel 16 configures an interior member extending along the vehicle width direction. Instrument panel reinforcement (not illustrated in the drawings) with an elongated profile running along the vehicle width direction is installed at an upper portion of the inside (vehicle front side) of the instrument panel 16. The instrument panel 16 is attached to the instrument panel reinforcement at plural locations. The instrument panel reinforcement is configured by a metal pipe member, and the two length direction end portions of the instrument panel reinforcement are fixed to lower portion sides of a pair of front pillars 20 that project upward at left and right vehicle body side sections.

A Heating, Ventilating, and Air Conditioning (HVAC) unit 22, serving as an air conditioning unit body, is provided inside the instrument panel 16. Specifically, the HVAC unit 22 is disposed at the vehicle front side and lower side of the instrument panel 16 of the vehicle 12. The HVAC unit 22 includes a main fan, not illustrated in the drawings, and a flow of air is formed by operating the main fan. An evaporator, a heater core, and the like (none of which are illustrated in the drawings) are provided at the air flow downstream side of the main fan so as to produce conditioned air in which the temperature, humidity, and the like of the flow of air are regulated. This flow of air is supplied to the exterior through plural blower outlets, not illustrated in the drawings.

Plural first ducts 24 are provided inside the instrument panel 16. Each of the first ducts 24 is, for example, formed in an angular tube shape using resin, and extends substantially along the vehicle width direction. One length direction end portion 24A of each of the first ducts 24 is connected to a blower outlet of the HVAC unit 22. Another length direction end portion 24B of each of the first ducts 24 is connected to a first opening 26, described later. Namely, the flow of air traveling from the blower outlets of the HVAC unit 22 travels through the first ducts 24 to the first openings 26. The first ducts 24 configured as described above are provided in a left and right pair centered on the HVAC unit 22.

A pair of left and right front doors 30, serving as doors, are provided at the vehicle width direction outer sides of the instrument panel 16. The front doors 30 are each supported so as to be capable of opening and closing with respect to a vehicle body (see FIG. 2) by an opening and closing mechanism, not illustrated in the drawings, provided at a front portion of the corresponding front door 30 and having a swing axis running substantially along the vehicle vertical direction.

A door trim 30A is provided on the vehicle cabin 14 side of each of the front doors 30. The door trim 30A is configured as an interior member that covers a sheet steel member configuring part of the front door 30 from the vehicle cabin side. A door blower outlet 30C that is open toward the vehicle cabin 14 side is formed at a vehicle upper side and vehicle rear side of the door trim 30A.

Figure 2:
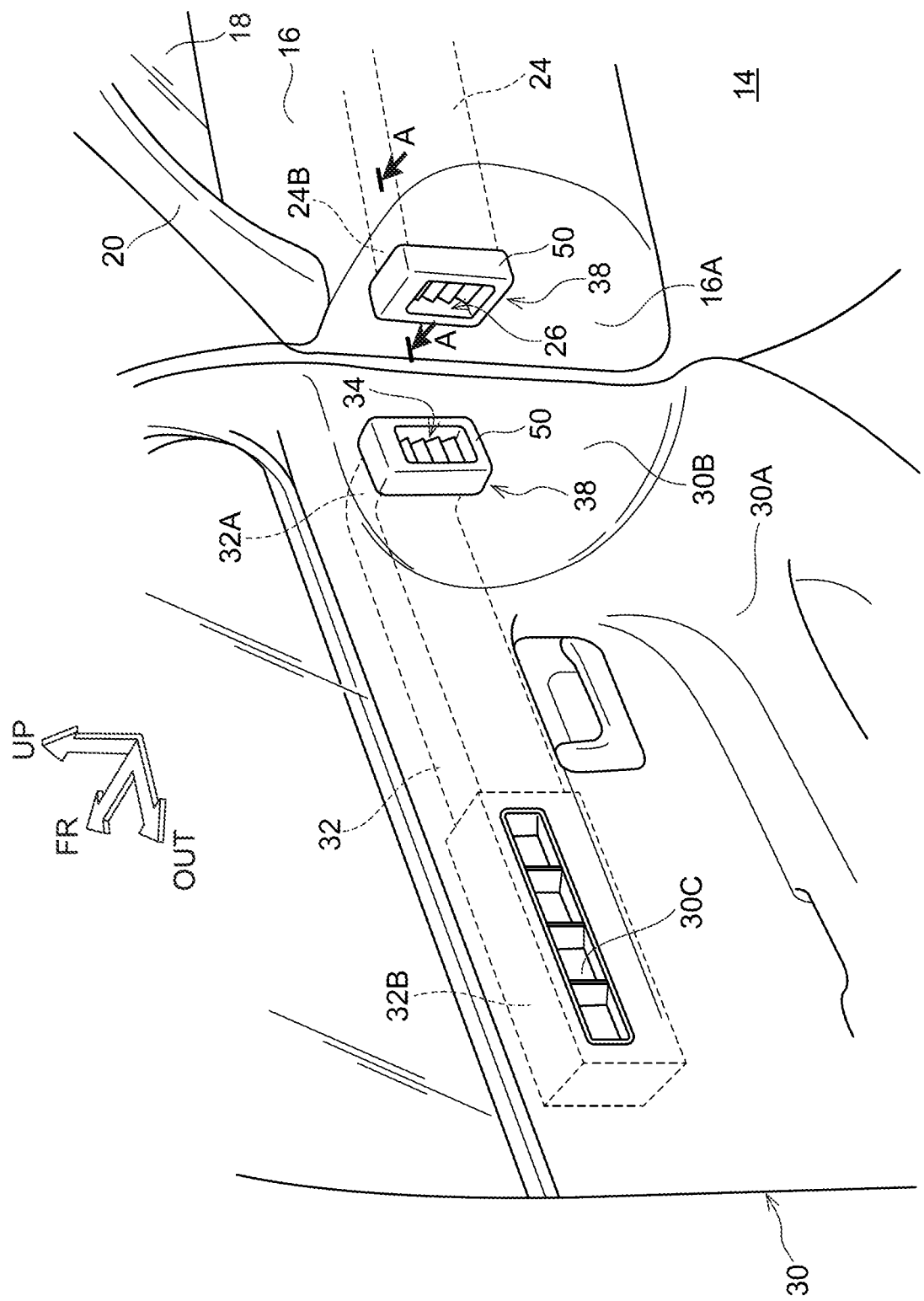
FIG. 2 is a schematic perspective view illustrating a state in which a (vehicle left side) front door has been opened in a vehicle provided with a vehicle air conditioning device according to an exemplary embodiment.

As illustrated in FIG. 2, an overlap portion 30B is formed at a location where each of the door trims 30A overlaps with a vehicle width direction outer side face 16A of the instrument panel 16 in a closed state of the corresponding front door 30 in vehicle side view. For example, the overlap portion 30B has a shape recessed toward the vehicle width direction outer side to match the vehicle width direction outer side face 16A of the instrument panel 16.

A second duct 32 is provided inside each of the front doors 30, specifically, between the sheet steel member of the front door 30 and the door trim 30A. For example, the second duct 32 is formed in an angular tube shape using resin, and extends substantially along the vehicle front-rear direction in a closed state of the corresponding front door 30 (see FIG. 1). One length direction end portion 32A of each of the second ducts 32 is connected to a second opening 34, described later. Another length direction end portion 32B of each of the second ducts 32 is connected to the door blower outlet 30C in the door trim 30A. Namely, when moving air travels to the second opening 34, the moving air passes through the second duct 32 and flows toward the vehicle cabin 14 interior through the door blower outlet 30C.

The first openings 26 are formed to the instrument panel 16 at locations corresponding to the overlap portions 30B of the front doors 30, namely in the vehicle width direction outer side faces 16A. Each of the first openings 26 is configured to be open toward the corresponding front door 30 side, and is formed in a substantially rectangular shape with its length direction in the vehicle vertical direction in vehicle side view.

Each of the second openings 34 is provided in the overlap portion 30B of the corresponding front door 30 (door trim 30A) at a position corresponding to the first opening 26. Each of the second openings 34 is configured to be open toward the instrument panel 16 side, and has substantially the same shape as the corresponding first opening 26. Namely, when the corresponding front door 30 is in a closed state, the first opening 26 and the second opening 34 overlap each other in vehicle side view, thereby achieving a state in which the insides of the first duct 24 and the second duct 32 are in communication with each other (see FIG. 1).

Shutter Device

Figure 3:
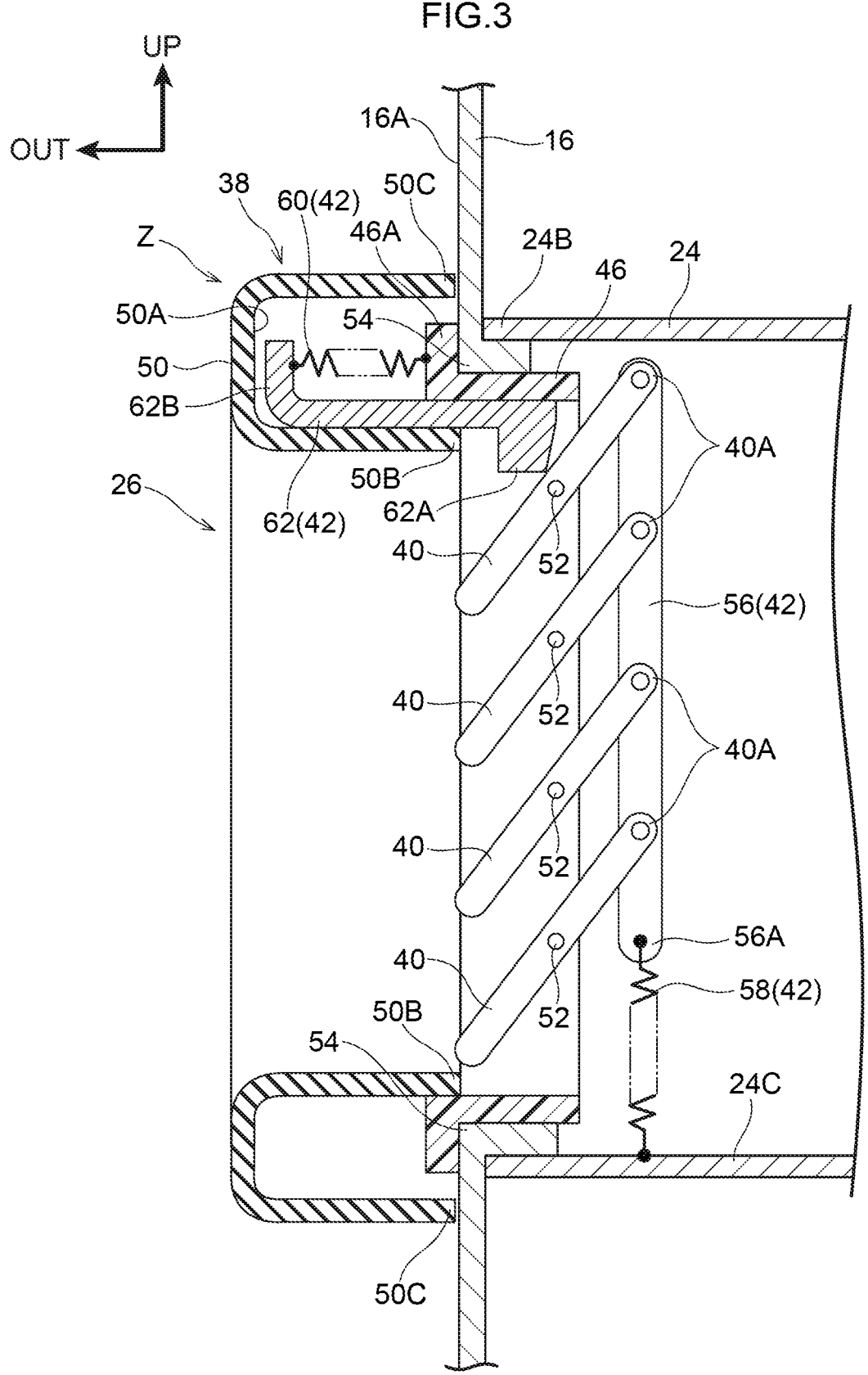
FIG. 3 is an enlarged cross-section illustrating a state sectioned along line A-A in FIG. 2.

Respective shutter devices 38 are attached to the first opening 26 and the second opening 34. As illustrated in FIG. 3, each of the shutter devices 38 is configured including plural fins 40, a link mechanism 42, a frame 46, and a seal member 50. Note that the shutter devices 38 attached to the first opening 26 and the second opening 34 according to the present exemplary embodiment are basically configured with plane symmetry (left-right symmetry about the vehicle width direction outer side face 16A of the instrument panel 16). Accordingly, the following explanation deals primarily with the shutter device 38 attached to each of the first openings 26.

Fins

Figure 4:
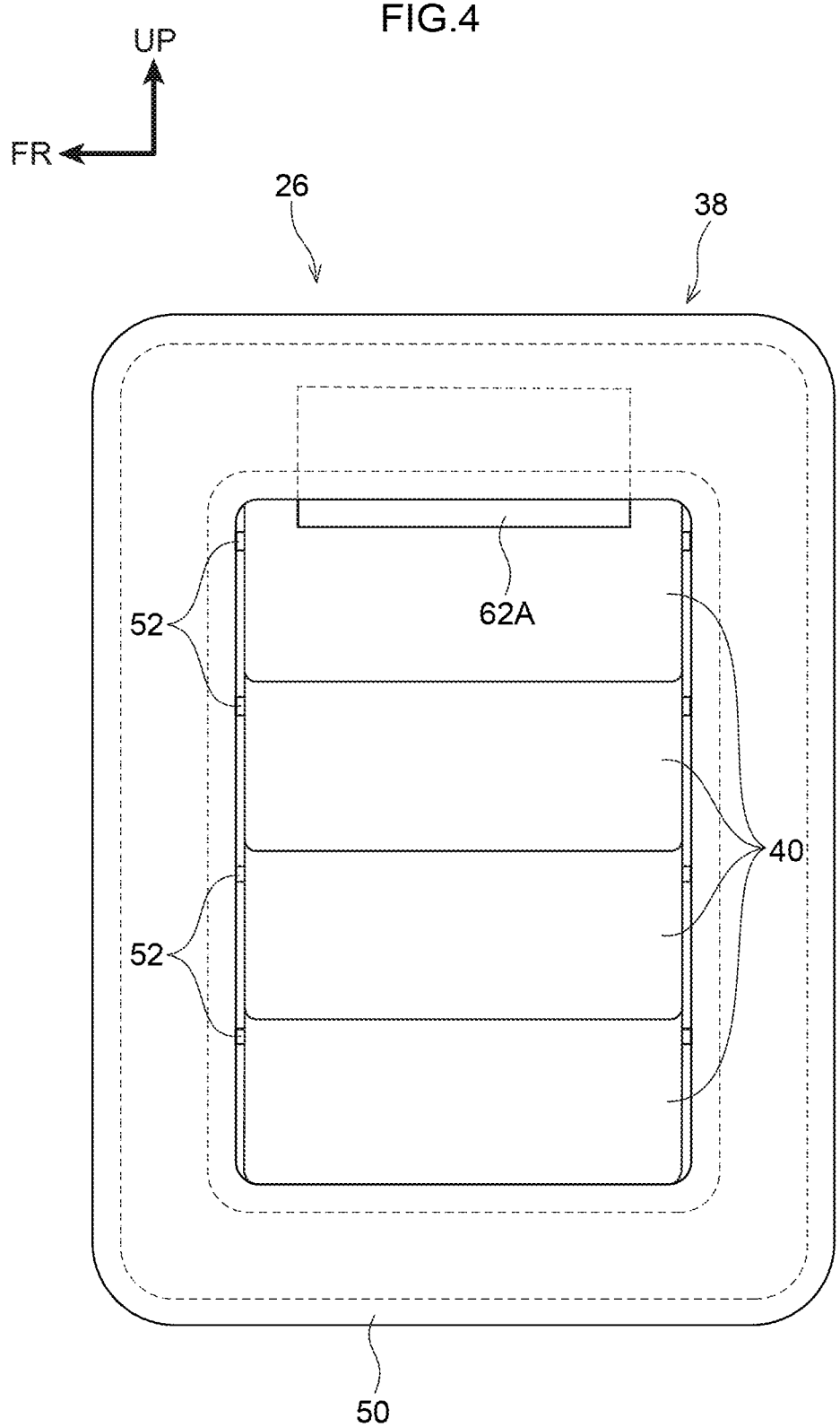
FIG. 4 is a side view illustrating a first opening illustrated in FIG. 2.

Each of the fins 40 is formed in a rectangular plate shape with its length direction along a width direction of the first opening 26. The fins 40 are axially supported by the frame 46 through fin shafts 52 (see FIG. 4), each with its axial direction along the width direction of the first opening 26. As illustrated in FIG. 4, a width direction dimension of each of the fins 40 is set such that adjacent fins 40 overlap each other in vehicle side view when the fins 40 are tilted toward the vehicle vertical direction around the fin shafts 52. In the present exemplary embodiment, as an example, four of the fins 40 are arrayed spaced apart from each other in the vehicle vertical direction. The fins 40 are coupled together through the link mechanism 42.

Frame

As illustrated in FIG. 3, the frame 46 is formed as a rectangular frame with substantially the same shape as the opening of the first opening 26. The frame 46 is inserted inside the first opening 26. A flange 46A is formed at a vehicle width direction outer side of the frame 46 inserted into the first opening 26, and the flange 46A is configured to be joined to the vehicle width direction outer side face 16A of the instrument panel 16 at a peripheral edge 54 of the first opening 26. Similarly, although not illustrated in the drawings, a flange 46A is formed at the vehicle width direction inner side of the frame 46 inserted into the second opening 34, and the flange 46A is configured to be joined to the overlap portion 30B of the door trim 30A at a peripheral edge of the second opening 34.

Link Mechanism

The link mechanism 42 is configured including a coupling rod 56, a first biasing member 58, a second biasing member 60, and a door opening-closing coordination rod 62. The coupling rod 56 is formed in a rectangular shape with its length direction along the vehicle vertical direction, and is coupled to inside end portions 40A on the first duct 24 inner side of the respective fins 40 so as to allow swinging.

A lower end portion 56A of the coupling rod 56 is engaged with a lower wall 24C of the first duct 24 through the first biasing member 58. The first biasing member 58 biases the coupling rod 56 toward the vehicle upper side, thereby biasing the fins 40 toward a state in which the end portions 40A of the fins 40 are tilted around the fin shafts 52 so as to be positioned at the vehicle upper side.

Figure 5:
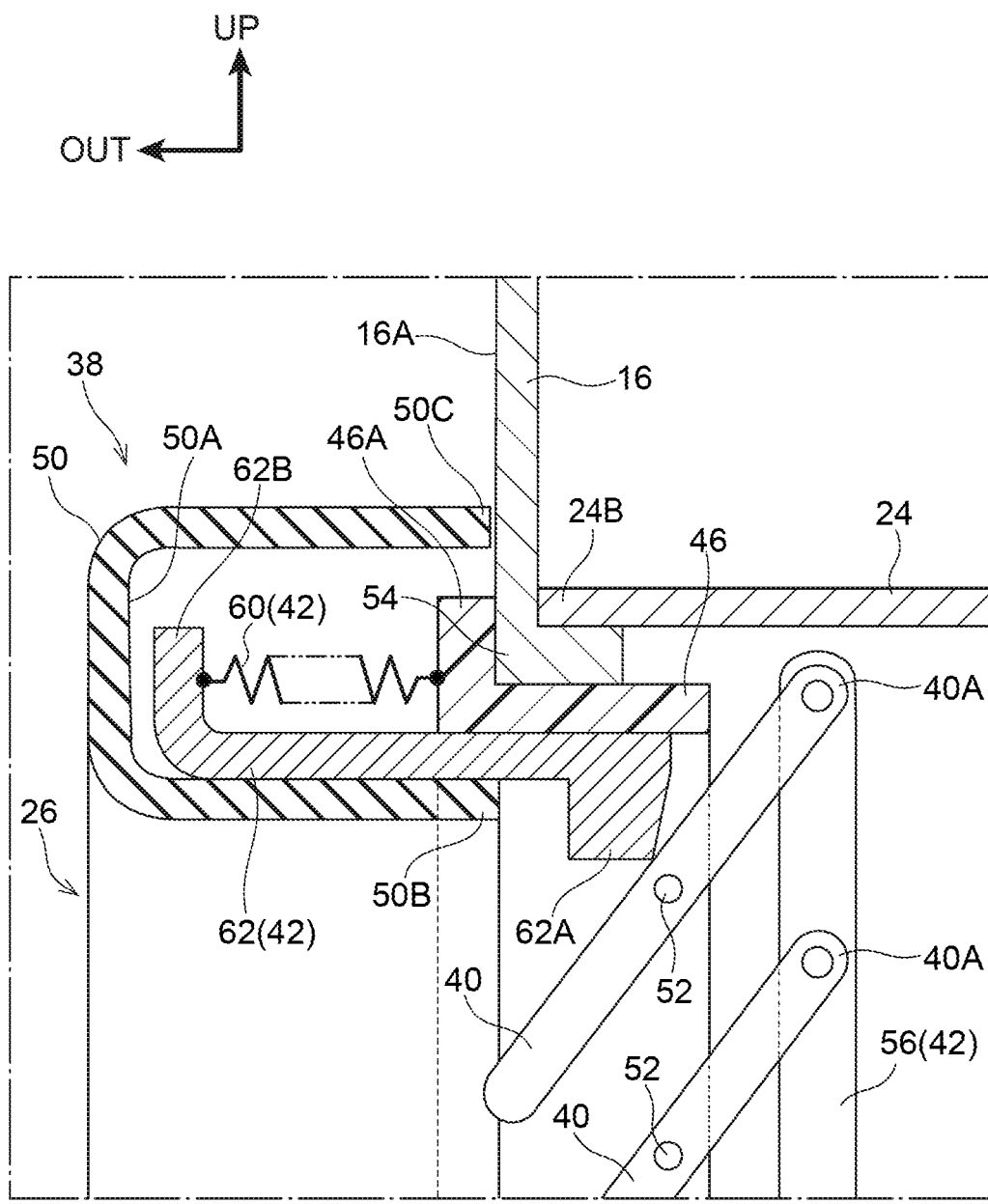
FIG. 5 is an enlarged cross-section in which the region Z in FIG. 3 is enlarged.

As illustrated in FIG. 5, the door opening-closing coordination rod 62 abuts the inside and vehicle upper side of the frame 46 so as to be capable of sliding, and extends along the vehicle width direction. A fin abutting portion 62A is formed at a vehicle width direction inner side end portion of the door opening-closing coordination rod 62. The fin abutting portion 62A is formed so as to project toward the vehicle lower side, and is capable of abutting an upper face of the fin 40 positioned at the vehicle upper side of the plural fins 40.

A folded portion 62B is formed at a vehicle width direction outer side end portion of the door opening-closing coordination rod 62. The folded portion 62B projects toward the vehicle upper side, and is engaged with the flange 46A of the frame 46 through the second biasing member 60. The second biasing member 60 biases the door opening-closing coordination rod 62 toward the vehicle width direction outer side.

The seal member 50 is provided about the peripheral edge 54 of the first opening 26. Specifically, the seal member 50 is formed in a substantially rectangular shape with its length direction along the vehicle vertical direction in vehicle side view (see FIG. 4). The seal member 50 is formed from an elastic member with a U-shaped cross-section profile opening toward the vehicle width direction inner side. Namely, the seal member 50 includes a hollow portion 50A therein. An end portion SOB on the opening side of the seal member 50 is joined to a member attached to the peripheral edge 54. Specifically, at the vehicle upper side of the seal member 50, the end portion 50B is adhered to a vehicle lower side face of the door opening-closing coordination rod 62 that slides against the frame 46 joined to the peripheral edge 54. Other than at the vehicle upper side of the seal member 50, the end portion 50B is adhered to the frame 46 that is joined to the peripheral edge 54 (see FIG. 3).

An end portion 50C on the opposite side to the opening side of the seal member 50 is positioned further to the outside of the opening than the frame 46, and is in a state in which the end portion 50C does not contact other members. The flange 46A of the frame 46, the door opening-closing coordination rod 62, and the second biasing member 60 are accommodated inside the hollow portion 50A.

Shutter Device Operation

Explanation follows regarding operation of the shutter device 38. As illustrated in FIG. 3, in an open state of the front door 30, the folded portion 62B of the door opening-closing coordination rod 62 is moved in a direction away from the peripheral edge 54 of the first opening 26 (toward the vehicle width direction outer side) by the second biasing member 60. Accordingly, since the fin abutting portion 62A of the door opening-closing coordination rod 62 is positioned at a location at the vehicle width direction outer side of the fin 40 at the vehicle upper side, a force acting toward the vehicle upper side from the first biasing member 58 is transmitted to the end portion 40A of each of the fins 40 through the coupling rod 56. The fins 40 are thus tilted around the fin shafts 52 such that the end portions 40A are positioned at the vehicle upper side, such that the inside of the first opening 26 is less likely to be seen (see FIG. 4). This state of the fins 40 corresponds to the "closed state" of the first aspect.

Figure 6:
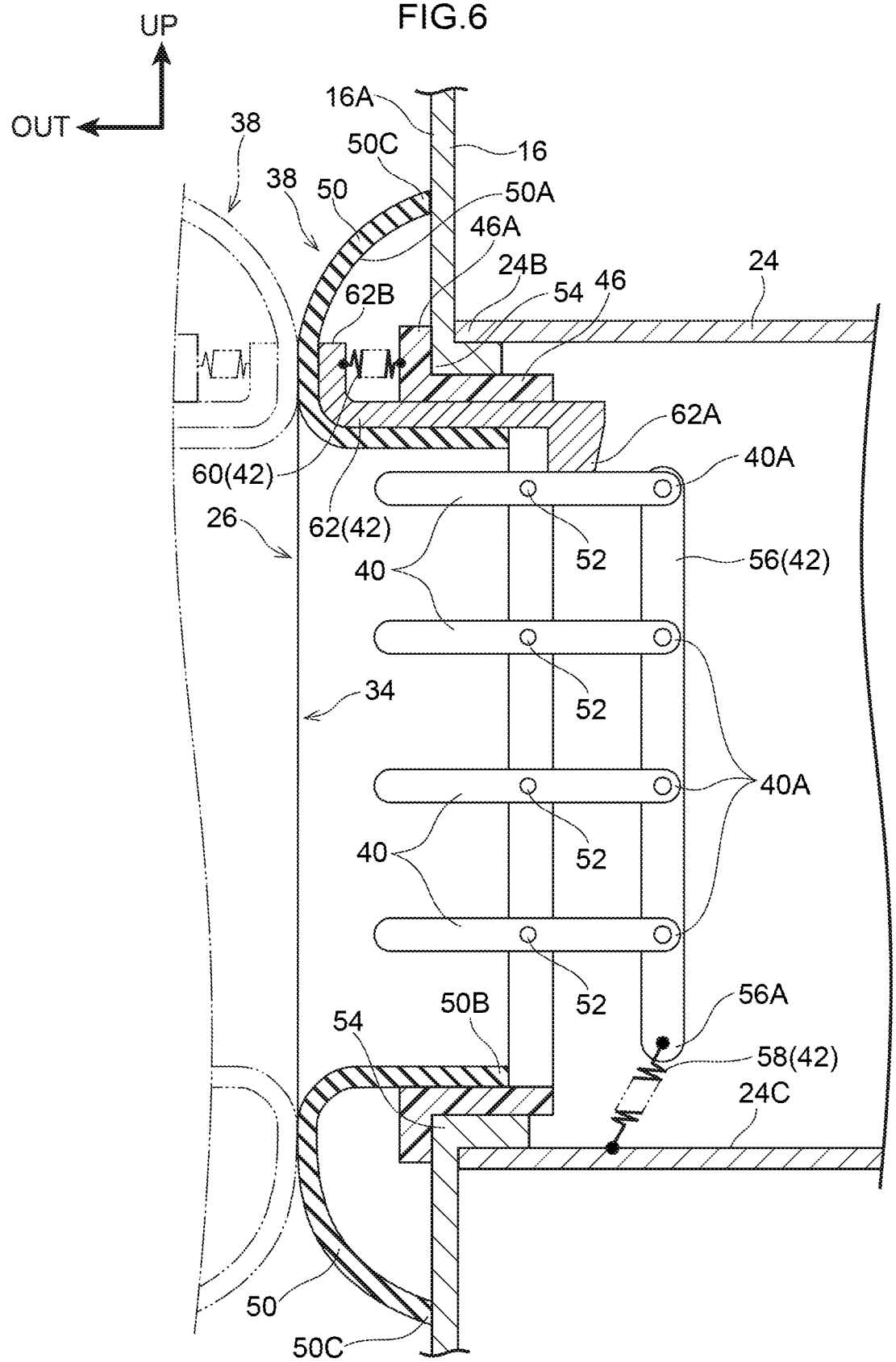
FIG. 6 is an enlarged cross-section corresponding to FIG. 3, illustrating a state in which a front door has been closed in a vehicle provided with a vehicle air conditioning device according to an exemplary embodiment.
Figure 7:
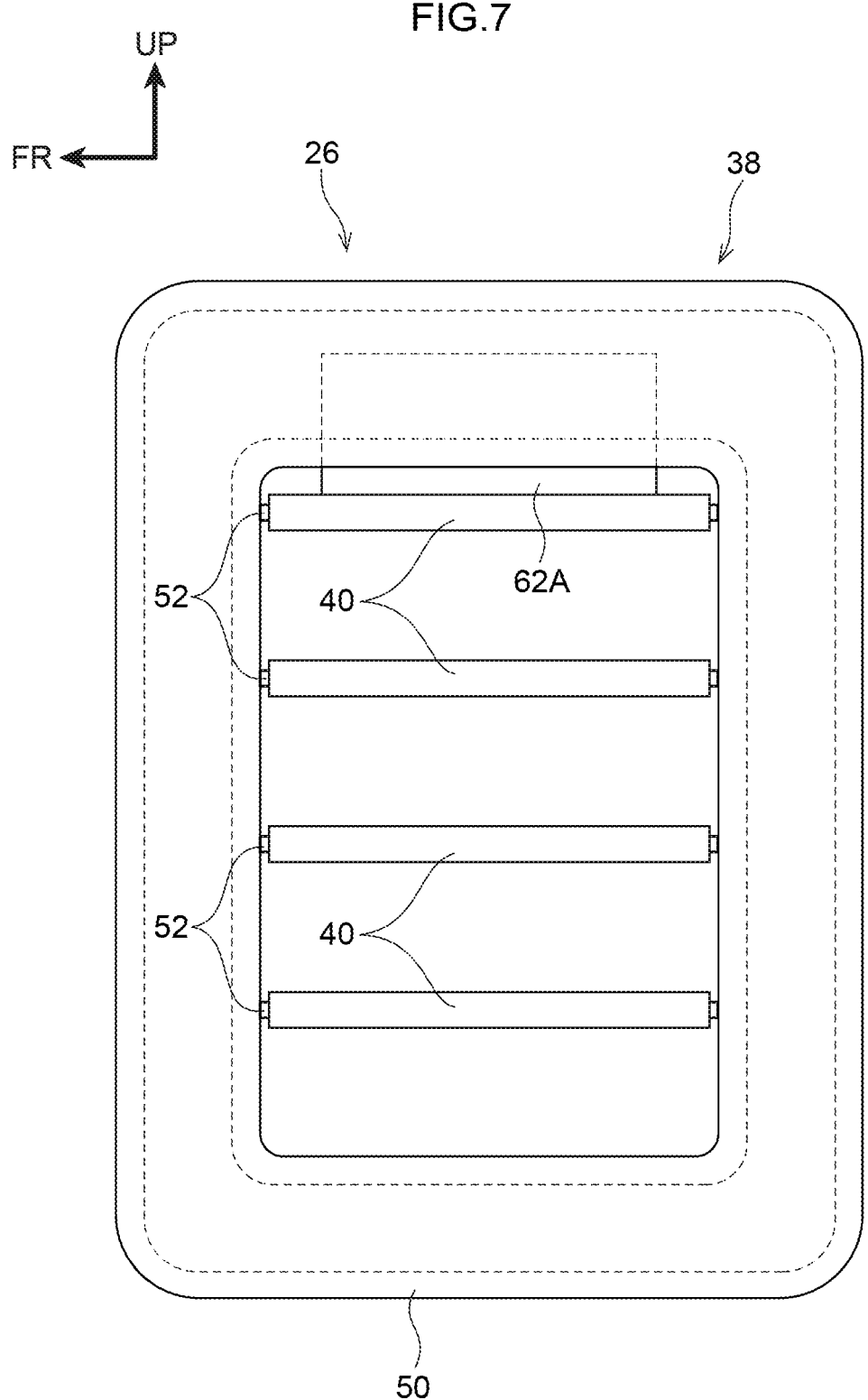
FIG. 7 is a side view corresponding to FIG. 4, illustrating a first opening in a state in which a front door has been closed in a vehicle provided with a vehicle air conditioning device according to an exemplary embodiment.

As illustrated in FIG. 6, in a closed state of the front door 30, the shutter device 38 on the instrument panel 16 (first opening 26) side and the shutter device 38 on the front door 30 (second opening 34) side are superimposed on each other. When this occurs, the door opening-closing coordination rod 62 is pushed through the seal member 50 in a direction approaching the peripheral edge 54 of the first opening 26 (toward the vehicle width direction inner side) against the biasing force of the second biasing member 60, such that the fin abutting portion 62A of the door opening-closing coordination rod 62 abuts a location at the vehicle width direction inner side of the fin 40 at the vehicle upper side. The end portion 40A of the fin 40 at the vehicle upper side is thereby pushed downward toward the vehicle lower side about the fin shaft 52, against the biasing force of the first biasing member 58. Note that the end portions 40A of the other fins 40 are also similarly pushed downward by the coupling rod 56. This state of the fins 40 corresponds to the "open state" of the first aspect. In this state, the respective fins 40 lie substantially horizontal about the fin shafts 52 (see FIG. 7), facilitating the passage of moving air traveling from the HVAC unit 22 and through the shutter devices 38.

Figure 8:
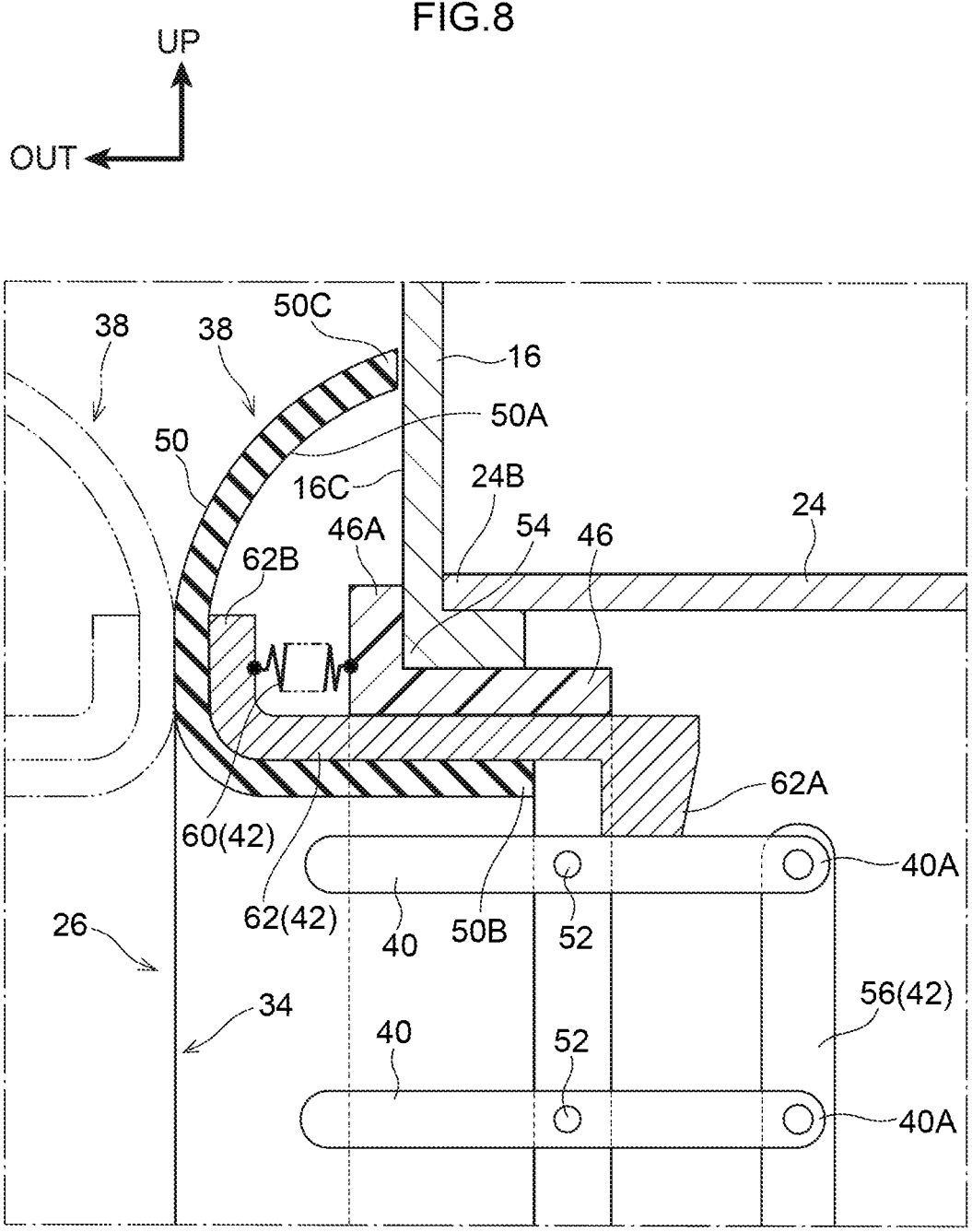
FIG. 8 is an enlarged cross-section corresponding to FIG. 5, illustrating a state in which a front door has been closed in a vehicle provided with a vehicle air conditioning device according to an exemplary embodiment.

As illustrated in FIG. 8, in a closed state of the front door 30, the seal member 50 is squashed. The end portion 50C of the seal member 50 absorbs deformation due to this squashing by being displaced in a direction away from the side of the opening.

As illustrated in FIG. 2, in the present exemplary embodiment, the front doors 30 that are capable of opening and closing are provided at the vehicle width direction outer sides of the instrument panel 16 provided at the front section of the vehicle cabin 14. Each of the front doors 30 includes the overlap portion 30B where part of the front door 30 overlaps with the instrument panel 16 in a closed state of the front door 30, and the door blower outlet 30C that is open toward the vehicle cabin 14 interior. The first openings 26 are provided at the instrument panel 16 at locations corresponding to the overlap portions 30B. The second openings 34 are formed in the overlap portions 30B of the front doors 30 at positions corresponding to the first openings 26. The HVAC unit 22 that supplies air through the blower outlets is provided inside the instrument panel 16. The one length direction end portion 24A of each of the tube shaped first ducts 24 is connected to the corresponding blower outlet of the HVAC unit 22, and the other length direction end portion 24B of each of the first ducts 24 is connected to the corresponding first opening 26, described above. Namely, moving air supplied from the HVAC unit 22 travels to the first openings 26 through the first ducts 24. The one length direction end portion 32A of each of the second ducts 32, which each has a similar tube shape to the first ducts 24, is connected to the corresponding second opening 34, described above, and the other length direction end portion 32B of the second duct 32 is connected to the corresponding door blower outlet 30C. Namely, when the first opening 26 and the second opening 34 are at overlapping positions due to the corresponding front door 30 being in a closed state, moving air supplied from the HVAC unit 22 passes through the first opening 26 and the second opening 34 and travels to the door blower outlet 30C.

The first opening 26 and the second opening 34 are each provided with the fins 40. The fins 40 place the first opening 26 and the second opening 34 in respective closed states when the corresponding front door 30 is open. Internal parts are thus less likely to be seen through the opening by an occupant when the corresponding front door 30 is in an open state. When the front door 30 is closed, the fins 40 place the first opening 26 and the second opening 34 in respective open states, such that the flow of moving air from the first duct 24 to the second duct 32 is not obstructed. This thereby enables external styling to be improved when the front door 30 is open.

As illustrated in FIG. 3, the fins 40 are axially supported by the fin shafts 52, each having an axial direction running along the width direction of the corresponding first opening 26 or second opening 34. When the front door 30 is open, the fins 40 are inclined toward the vehicle vertical direction around the fin shafts 52 by the link mechanism 42 so as to place the first opening 26 and the second opening 34 in the closed states. As illustrated in FIG. 6, when the front door 30 is closed, the fins 40 are swung by the link mechanism 42 so as to lie substantially horizontal about the fin shafts 52, thereby placing the first opening 26 and the second opening 34 in the open states. Namely, the simple configuration employing the link mechanism 42 enables movement of the fins 40 to be coordinated with opening and closing of the front door 30. This enables costs to be suppressed.

Attaching the seal members 50 to the peripheral edges 54 of the first opening 26 and the second opening 34 enables moving air flowing from the first duct 24 to the second duct 32 to be suppressed from leaking out between the first opening 26 and the second opening 34 when the first opening 26 and the second opening 34 are in an overlapping state as illustrated in FIG. 1. This enables air to be supplied efficiently.

As illustrated in FIG. 3, the seal member 50 includes the hollow portion 50A therein. Since at least a portion of the link mechanism 42 is accommodated in the hollow portion 50A, locations of the link mechanism 42 that are exposed to the exterior can be reduced or eliminated, making the link mechanism 42 less noticeable in an open state of the front door 30. This thereby enables a further improvement to external styling when the front door 30 is open.

Moreover, the opening side end portion 50B of the seal member 50 is joined to the frame 46 that is joined to the peripheral edge 54, and to the door opening-closing coordination rod 62 that slides against the frame 46. This enables the deformed seal member 50 to be suppressed from entering the inside of the opening of the corresponding first opening 26 or second opening 34 and obstructing the operation of the fins 40 when the seal member 50 is squashed. This thereby enables the operation of the fins 40 to be performed more reliably.

In the exemplary embodiment described above, the link mechanism 42 is configured to be operated by the door opening-closing coordination rod 62 that abuts the link mechanism 42 through the seal member 50 when the door is closed. However, there is no limitation thereto. As an example, the link mechanism 42 may be connected to and operate in coordination with a location of the front door 30, such as a door check, that is displaced during opening and closing. In such cases, force of the opening or closing door can be utilized to operate the fins 40. This thereby enables the fins 40 to be operated efficiently.

Although configuration is made in which plural of the fins 40 are provided, there is no limitation thereto, and configuration may be made using a single fin 40.

Although configuration is made in which respective shutter devices 38 are provided at the first opening 26 and the second opening 34, there is no limitation thereto, and configuration may be made in which a shutter device 38 is provided at either the first opening 26 or the second opening 34.

Although explanation has been given regarding an exemplary embodiment of the present disclosure, the present disclosure is not limited to the above, and obviously various other modifications may be implemented within a range not departing from the spirit of the present disclosure.

What is claimed is:
1. A vehicle air conditioning device comprising:
an instrument panel that is provided at a front side of a vehicle cabin;
a door that is provided at a vehicle width direction outer side of the instrument panel so as to be capable of opening and closing, and the door includes an overlapping portion where part of the door overlaps with the instrument panel in a closed state of the door, and a door blower outlet that opens toward a vehicle cabin interior;

a first opening that is provided at the instrument panel at a location corresponding to the overlapping portion of the door and that is open toward the door;

a second opening that is provided at the overlapping portion of the door at a location corresponding to the first opening and that is open toward the instrument panel;

an air conditioning unit body that is provided inside the instrument panel and that supplies air through a blower outlet;

a first duct that is formed in a tube shape, that has one length direction end portion connected to the blower outlet, and that has another length direction end portion connected to the first opening;

a second duct that is formed in a tube shape, that has one length direction end portion connected to the second opening, and that has another length direction end portion connected to the door blower outlet; and a fin member respectively provided at the first opening and the second opening to place the first opening and the second opening in a closed state when the door is open, and to place the first opening and the second opening in an open state when the door is closed.

2. The vehicle air conditioning device of claim 1, wherein:

the fin member is axially supported by a fin shaft with an axial direction running along a width direction of the first opening or the second opening;

the fin member is inclined toward a vehicle vertical direction around the fin shaft by a link mechanism when the door is open so as to place the first opening or the second opening in the closed state; and the fin member is swung around the fin shaft by the link mechanism when the door is closed so as to lie substantially horizontal and place the first opening or the second opening in the open state.

3. The vehicle air conditioning device of claim 2, wherein the link mechanism is connected to a location that is displaced during opening and closing of the door.

4. The vehicle air conditioning device of claim 2, wherein a seal member is respectively provided at a peripheral edge of the first opening and a peripheral edge of the second opening.

5. The vehicle air conditioning device of claim 4, wherein:
the seal member includes a hollow portion therein; and
at least a portion of the link mechanism is accommodated inside the hollow portion.

6. The vehicle air conditioning device of claim 2, wherein:
the fin member is configured by a plurality of fins; and
the link mechanism includes:
- a coupling rod that is disposed further toward an inside of the first duct or the second duct than the fin shaft, and that axially supports and couples together the plurality of fins,
- a door opening-closing coordination rod that extends along the vehicle width direction at a peripheral edge of the first opening or the second opening, and that includes a fin abutting portion configured to abut at least one fin among the plurality of fins inside of the first duct or the second duct in at least the open state,
- a first biasing member configured to apply a biasing force to the coupling rod in a direction to transmit the biasing force to the plurality of fins, and
- a second biasing member configured to apply a biasing force to the door opening-closing coordination rod in a direction from the inside toward an outside of the first duct or the second duct.

7. The vehicle air conditioning device of claim 6, further comprising:
a frame-shaped frame formed at the peripheral edge of the first opening and the second opening, and inserted into the first opening or the second opening,
wherein the door opening-closing coordination rod abuts the frame such that the door opening-closing coordination rod is capable of being slid by the second biasing member.

8. The vehicle air conditioning device of claim 1, wherein a seal member is respectively provided at a peripheral edge of the first opening and a peripheral edge of the second opening.

9. The vehicle air conditioning device of claim 8, wherein an opening side end portion of each seal member is joined to at least one of the corresponding peripheral edge or a member attached to the peripheral edge.

* * * * *